US008096871B2

(12) United States Patent
Roelofs

(10) Patent No.: US 8,096,871 B2
(45) Date of Patent: Jan. 17, 2012

(54) GAMING MACHINE AND METHOD

(75) Inventor: Karl Roelofs, Charlottesville, VA (US)

(73) Assignee: Video Gaming Technologies, Inc., Brentwood, TN (US)

( * ) Notice: Subject to any disclaimer, the term of this patent is extended or adjusted under 35 U.S.C. 154(b) by 993 days.

(21) Appl. No.: 12/024,212

(22) Filed: Feb. 1, 2008

(65) Prior Publication Data

US 2008/0188285 A1 Aug. 7, 2008

Related U.S. Application Data

(60) Provisional application No. 60/887,638, filed on Feb. 1, 2007.

(51) Int. Cl.
*A63F 9/24* (2006.01)
*A63F 13/00* (2006.01)
*A63F 13/06* (2006.01)
*A63F 13/10* (2006.01)

(52) U.S. Cl. ................ 463/20; 463/16; 463/30; 463/31; 463/34; 273/139; 273/243; 273/461

(58) Field of Classification Search .............. 463/16–20, 463/22, 25, 30–34, 46–47; 273/118 R, 121 B, 273/138.2, 139, 141 A, 142 R, 142 H, 142 HA, 273/143 R, 145 R, 147, 148 B, 243, 269, 273/292, 460–461; *A63F 9/24, 13/00, 13/06, A63F 13/10*
See application file for complete search history.

(56) References Cited

U.S. PATENT DOCUMENTS 5,423,556 A * 6/1995 Latypov ............................ 463/9
5,833,536 A * 11/1998 Davids et al. ................... 463/11
5,935,002 A * 8/1999 Falciglia ......................... 463/19
5,947,820 A 9/1999 Morro et al.
5,980,384 A * 11/1999 Barrie ............................ 463/16
6,309,299 B1 * 10/2001 Weiss .............................. 463/20
6,428,412 B1 * 8/2002 Anderson et al. ................. 463/9
6,650,952 B1 * 11/2003 Garcia et al. .................... 700/91
6,921,334 B1 7/2005 Bennett
7,004,834 B2 * 2/2006 Walker et al. ................... 463/16
7,037,191 B2 5/2006 Rodgers et al.
7,094,147 B2 * 8/2006 Nakata et al. ..................... 463/9
7,175,523 B2 * 2/2007 Gilmore et al. ................. 463/16
7,354,344 B2 4/2008 Paulsen et al.
7,431,646 B2 * 10/2008 Jackson .......................... 463/16
(Continued)

FOREIGN PATENT DOCUMENTS

GB 2 406 958 A 4/2006
(Continued)

*Primary Examiner* — Arthur O. Hall
(74) *Attorney, Agent, or Firm* — Howard & Howard Attorneys PLLC

(57) ABSTRACT

A gaming machine includes a display having a reel section and a grid section. The reel section includes a plurality of cells arranged in one reel row and a plurality of reel columns. The grid section includes a plurality of cells arranged in a plurality of grid rows and a plurality of grid columns, with each of the reel columns corresponding to a specific grid column. A game is played by repeating the steps of displaying icons in each of the cells in the reel section, selecting one of the icons in the reel section and transferring the selected icon to the lowermost unoccupied cell in the grid column corresponding to the reel column in which the icon is displayed. The game is won when an alignment of icons in the grid section is equal to a defined winning grid alignment of icons.

36 Claims, 6 Drawing Sheets

U.S. PATENT DOCUMENTS

| | | | | |
|---|---|---|---|---|
| 7,527,557 | B2 * | 5/2009 | Jackson | 463/20 |
| 7,749,082 | B2 * | 7/2010 | Dunaevsky et al. | 463/32 |
| 7,896,738 | B2 * | 3/2011 | Okada | 463/20 |
| 2002/0094854 | A1 | 7/2002 | Morita et al. | |
| 2006/0068876 | A1 * | 3/2006 | Kane et al. | 463/16 |
| 2006/0160595 | A1 | 7/2006 | Gerson et al. | |
| 2006/0252494 | A1 | 11/2006 | Gerson et al. | |
| 2006/0252495 | A1 | 11/2006 | Gerson et al. | |
| 2006/0284375 | A1 * | 12/2006 | Littel | 273/266 |
| 2007/0099687 | A1 | 5/2007 | Gerson et al. | |
| 2007/0124452 | A1 | 5/2007 | Mohammed | |
| 2007/0218972 | A1 | 9/2007 | Gerson et al. | |
| 2007/0287523 | A1 | 12/2007 | Esses et al. | |
| 2008/0051174 | A1 * | 2/2008 | Fiden | 463/20 |
| 2008/0051190 | A1 * | 2/2008 | Okada | 463/21 |
| 2008/0076513 | A1 | 3/2008 | Esses et al. | |
| 2008/0102923 | A1 | 5/2008 | Esses et al. | |
| 2008/0113769 | A1 | 5/2008 | Montero et al. | |
| 2008/0119260 | A1 | 5/2008 | Nores | |
| 2008/0119261 | A1 | 5/2008 | Heymann | |
| 2008/0153570 | A1 | 6/2008 | Esses et al. | |
| 2008/0167116 | A1 | 7/2008 | Gerson | |
| 2008/0318660 | A1 | 12/2008 | Nores | |
| 2009/0061982 | A1 | 3/2009 | Brito | |
| 2009/0124328 | A1 | 5/2009 | Nores | |
| 2009/0124352 | A1 | 5/2009 | Gerson | |
| 2009/0286586 | A1 | 11/2009 | Heymann et al. | |
| 2010/0004048 | A1 | 1/2010 | Brito | |

FOREIGN PATENT DOCUMENTS

| | | | |
|---|---|---|---|
| WO | 2006076462 | A2 | 7/2006 |
| WO | 2007076514 | A2 | 7/2007 |
| WO | 2007081310 | A1 | 7/2007 |
| WO | 2007143704 | A2 | 12/2007 |
| WO | 2008011600 | A2 | 1/2008 |
| WO | 2008039413 | A2 | 4/2008 |
| WO | 2008051518 | A2 | 5/2008 |
| WO | 2008057201 | A2 | 5/2008 |
| WO | 2008057301 | A2 | 5/2008 |
| WO | 2008060471 | A2 | 5/2008 |
| WO | 2008060472 | A2 | 5/2008 |
| WO | 2008060473 | A2 | 5/2008 |
| WO | 2009032130 | A2 | 3/2009 |

* cited by examiner

GAMING MACHINE AND METHOD

CROSS REFERENCE TO RELATED APPLICATION

This application claims the benefit of U.S. Provisional Patent Application Ser. No. 60/887,638 filed on Feb. 1, 2007, the disclosure of which is hereby incorporated by reference.

FIELD OF THE INVENTION

The subject invention generally relates to a method of playing a game. The subject invention also generally relates to a gaming machine for playing the game thereon.

BACKGROUND OF THE INVENTION

Manufacturers of gaming machines continually strive to develop new games and gaming machines for playing the games thereon that provide as much enjoyment and excitement to existing players as possible to keep existing players from becoming bored. Additionally, the manufacturers of gaming machines also strive to develop new games and gaming machines that will appeal to and attract new players. There currently exist several types of mechanical and video slot machines, as well as simple video gaming machines embodying commonly played games, such as blackjack, poker, etc. However, these types of games and gaming machines do not particularly appeal to a younger audience of potential new players who grew up with extensive exposure to arcade style video games.

U.S. Pat. No. 5,769,716 to Saffari et al. discloses a game and an associated gaming machine. The gaming machine includes a display for displaying a grid section having a plurality of cells arranged in a plurality of rows and a plurality of columns. The gaming machine generates a single icon, which is displayed above the grid section. A player selects one of the columns into which the icon is transferred. The icon is transferred, i.e., falls, into the lowermost unoccupied cell in the selected column. The gaming machine indicates a win when an alignment of icons positioned in the grid section is equal to a predefined winning alignment.

U.S. Pat. No. 7,144,322 to Gomez et al., discloses a game and an associated gaming machine. The gaming machine includes a display for displaying a grid section having a plurality of cells arranged in a plurality of rows and a plurality of columns. The gaming machine generates a random selection of icons to fill each cell of the grid section, i.e., the gaming machine randomly displays one icon in each of the cells of the grid section. The gaming machine indicates a win when an alignment of icons positioned in the grid section is equal to a predefined winning alignment. Icons equaling the predefined winning alignment are removed from the grid section. The icons displayed in the columns above the icons removed are shifted downward within their respective columns to fill any unoccupied cells upon removing the icons equaling the predefined winning alignment.

The present invention is directed at one or more of the problems set forth above.

SUMMARY OF THE INVENTION

In one aspect of the present invention, a method of playing a game on a gaming machine is provided. The gaming machine includes a display having a reel section and a grid section. The reel section defines a plurality of cells disposed in one reel row and a plurality of reel columns. The grid section defines a plurality of cells disposed in a plurality of grid rows and a plurality of grid columns. Each of the grid columns corresponds to one specific reel column. The method comprises the steps of defining a winning grid alignment of icons; displaying an icon in each cell of the reel section of the display; selecting one of the icons displayed in the reel section of the display; transferring the selected icon from the reel section to a lowermost unoccupied cell in the grid column of the grid section corresponding to the specific reel column in which the icon is displayed; repeating the steps of displaying an icon in each cell of the reel section of the display, selecting one of the icons displayed in the reel section of the display and transferring the selected icon from the reel section to the lowermost unoccupied cell in the grid column of the grid section corresponding to the specific reel column in which the icon is displayed to position a plurality of icons in the grid section of the display; and indicating a win if an alignment of the icons positioned in the grid section of the display is equal to the defined winning grid alignment.

In a second aspect of the present invention, a gaming machine is provided. The gaming machine comprises a controller including a processor. The processor operates a software program. The controller further includes a memory for storing data thereon. The gaming machine further comprises a display. The display includes a reel section for displaying a plurality of icons in one reel row and a plurality of reel columns. The display also includes a grid section for displaying a plurality of icons in a plurality of grid rows and a plurality of grid columns. Each of the grid columns corresponds to one of the reel columns. The gaming machine further comprises a selector device. The selector device selects one of the icons displayed in the reel section of the display. The gaming machine further comprises a transfer device. The transfer device transfers a selected icon from the reel column in the reel section to the grid column in the grid section corresponding to the reel column in which the icon is displayed.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
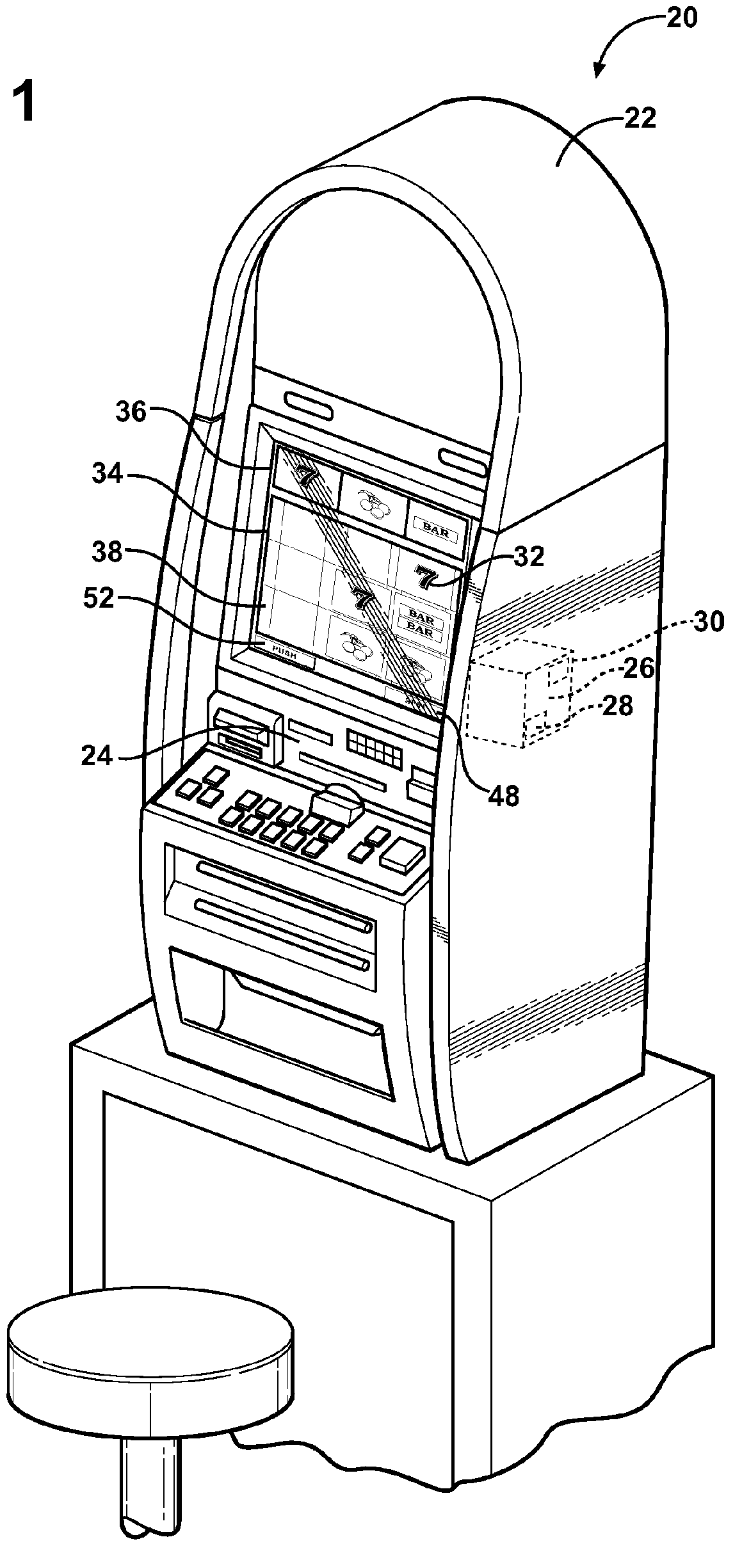
FIG. 1 is a perspective view of a gaming machine.

Referring to FIG. 1, wherein like numerals indicate corresponding parts throughout the several views, a gaming machine is shown generally at 20.

The gaming machine 20 includes a cabinet 22 for supporting and containing various components therein. In one embodiment, the cabinet 22 includes a size and shape of a typical slot machine, but it should be appreciated that the cabinet 22 may be customized for a particular gaming theme. The gaming machine 20 may further include a monetary value input device 24 for receiving a monetary value from the user. The monetary value input device 24 is mounted to the cabinet 22 as is well known. The monetary value input device 24 permits the gaming machine 20 to be used for wagering, i.e., gambling purposes. The monetary value input device 24 may include a coin slot, a bill reader, a credit card reader, and/or an electronic transfer mechanism to transfer the monetary value electronically. It should be appreciated that the gaming machine 20 may be implemented without the monetary value input device 24 for non-wagering, amusement purposes.

The gaming machine 20 further includes a controller 26 having a processor 28 and a memory 30. In one embodiment, the controller 26 includes a computer or some other similar device. The memory 30 stores data files therein, including data files for a software program and for a plurality of icons 32, i.e., images. The software program includes the operating instructions for the game as is well known. The processor 28 is for operating the software program as is also well known.

The gaming machine 20 includes at least one display 34 coupled to the controller 26 for displaying images on the display 34. The display 34 is mounted to and supported by the cabinet 22. The display 34 may include an LCD touch screen display 34. Alternatively, the display 34 may include some other similar touch sensitive device for inputting commands into the controller 26. It should be appreciated that the display 34 need not include a touch screen and need only be capable of displaying an image on the display 34. In one embodiment, the display 34 includes a reel section 36 and a grid section 38. However it should be appreciated that the display 34 may alternatively include a first display 34 for displaying the reel section 36 and a second display 34 for displaying the grid section 38.

Figure 2:
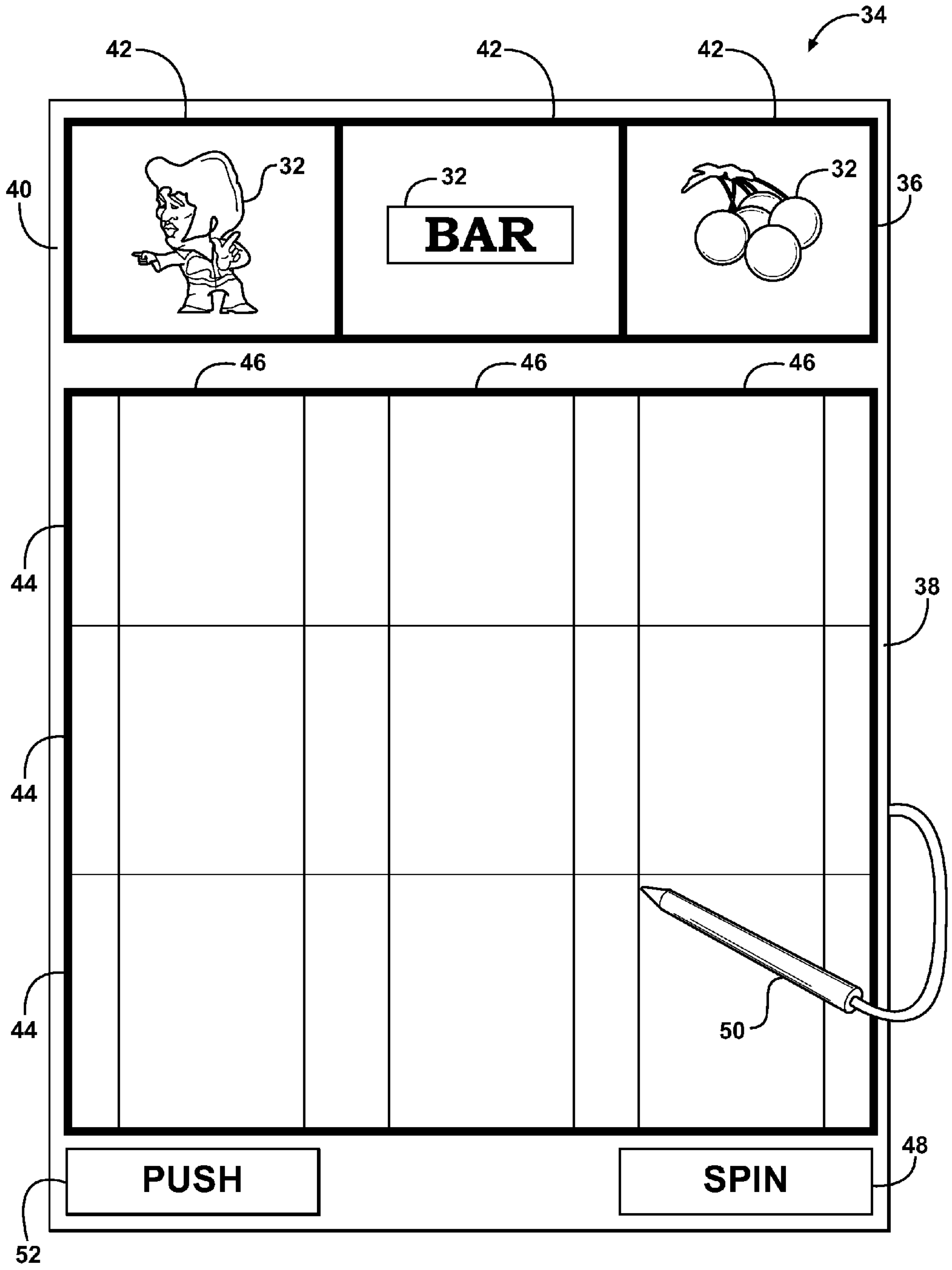
FIG. 2 is a graphical representation of a display of a gaming machine showing a reel section and a grid section with a 3×3 grid.

The reel section 36 displays 34 simulated reels, such as those displayed in a traditional slot machine. In one embodiment, the reel section 36 displays a plurality of icons 32 in one reel row 40 and a plurality of reel columns 42, with each simulated reel preferably displaying one icon 32. As shown in FIG. 2, the reel section 36 includes three reels. It should be appreciated that the number of simulated reels may vary. Each simulated reel of the reel section 36 includes a plurality of icons 32 or symbols that are displayable on the reel section 36 of the display 34. As the reels are simulated, the memory 30 stores a plurality of data files that include the displayable icons 32. As shown in FIG. 2, only one of the plurality of icons 32 is shown for each simulated reel in the reel section 36. However, it should be appreciated that more than one of the plurality of icons 32 may be shown on each simulated reel of the reel section 36, such as is often the case in a traditional slot machine. In one embodiment, for example, the reel section 36 may include a plurality of reel rows 40 and a pay-line as is common in traditional slot machines. The pay-line would then designate which icons 32 may be selected as described below, i.e., only an icon 32 falling on the pay-line may be selected.

Figure 4:
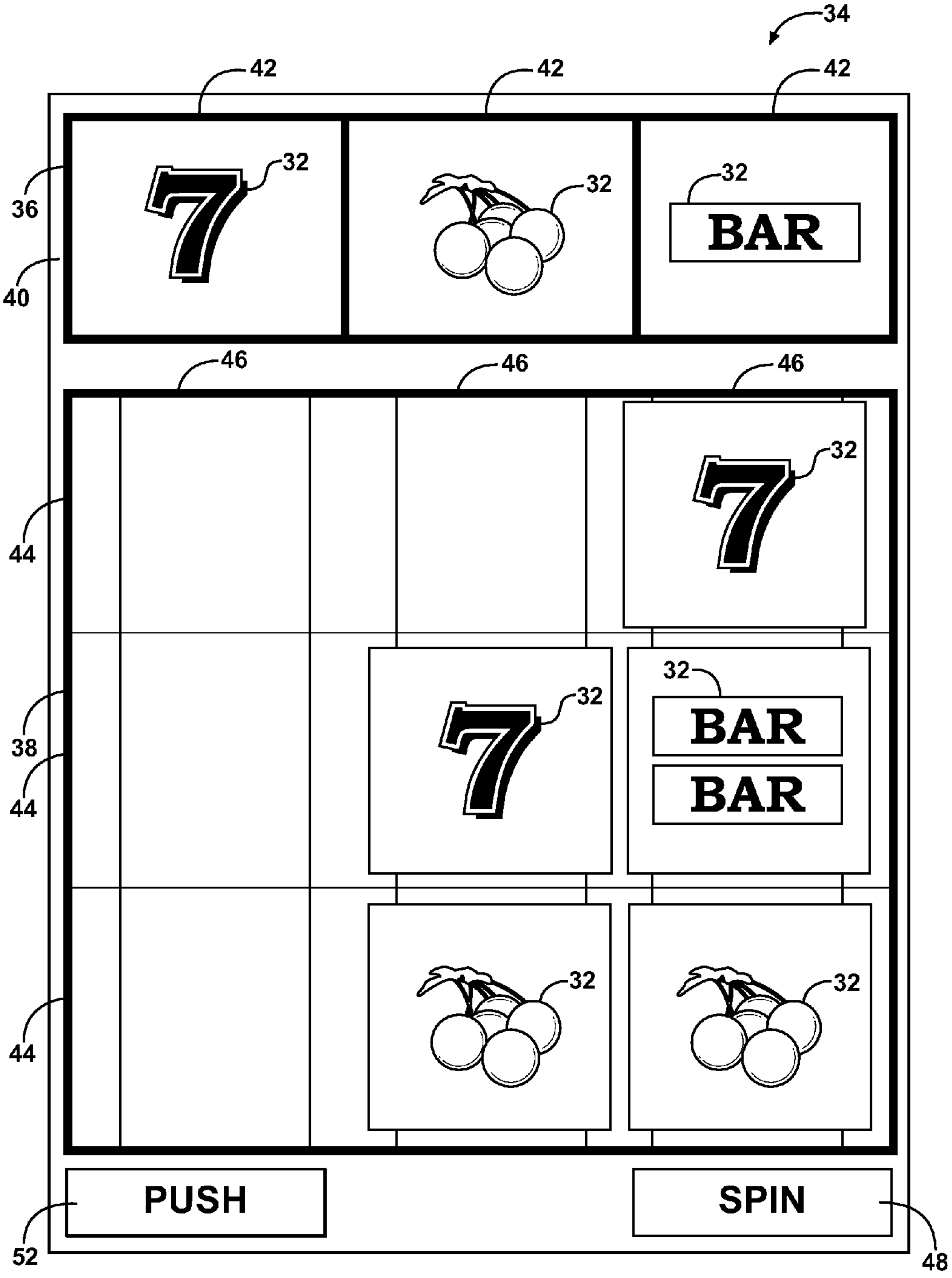
FIG. 4 is a graphical representation of the display showing the grid section holding a plurality of icons.
Figure 5:
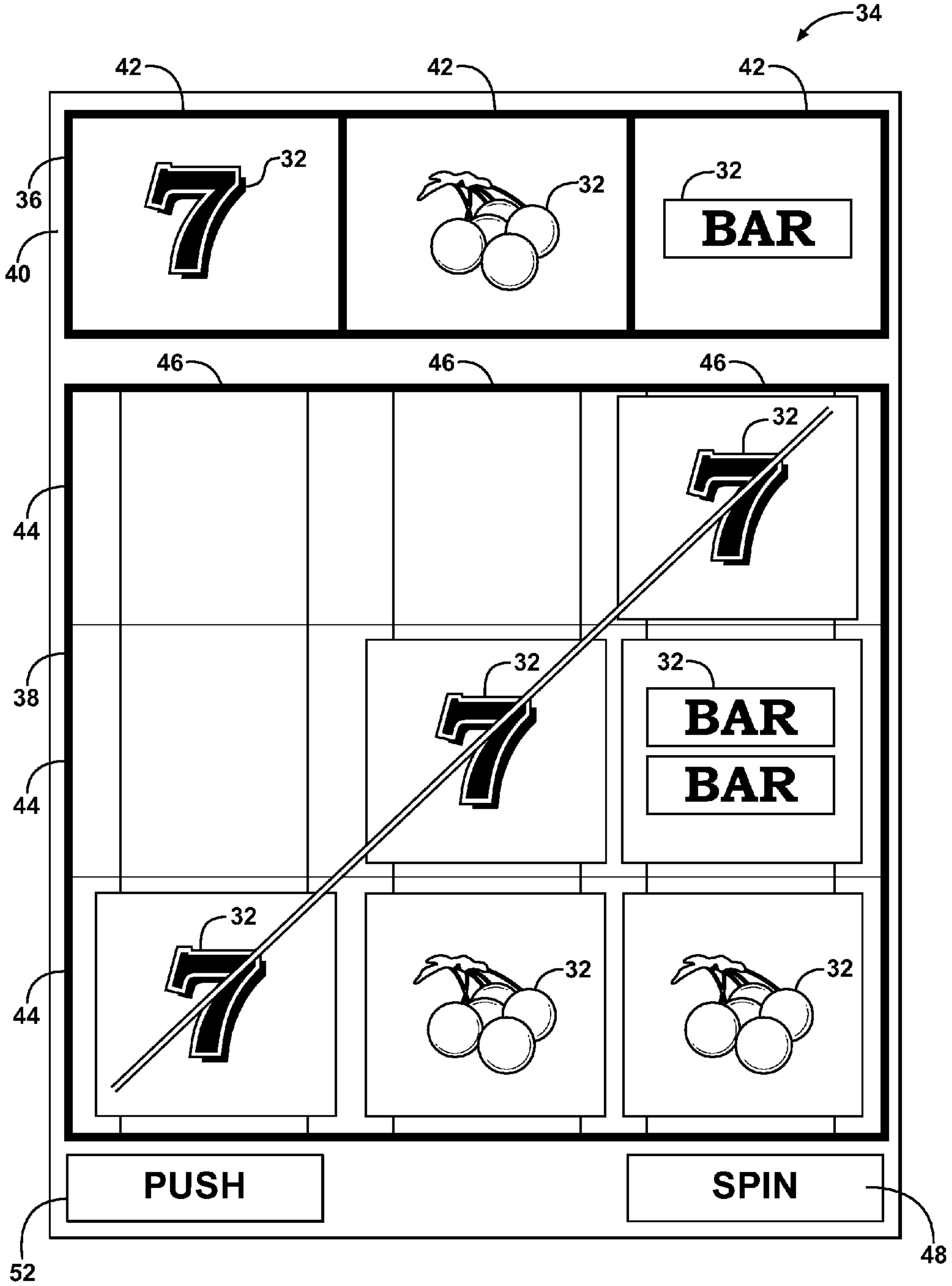
FIG. 5 is a graphical representation of the display showing the grid section with three icons forming a winning pattern.
Figure 6:
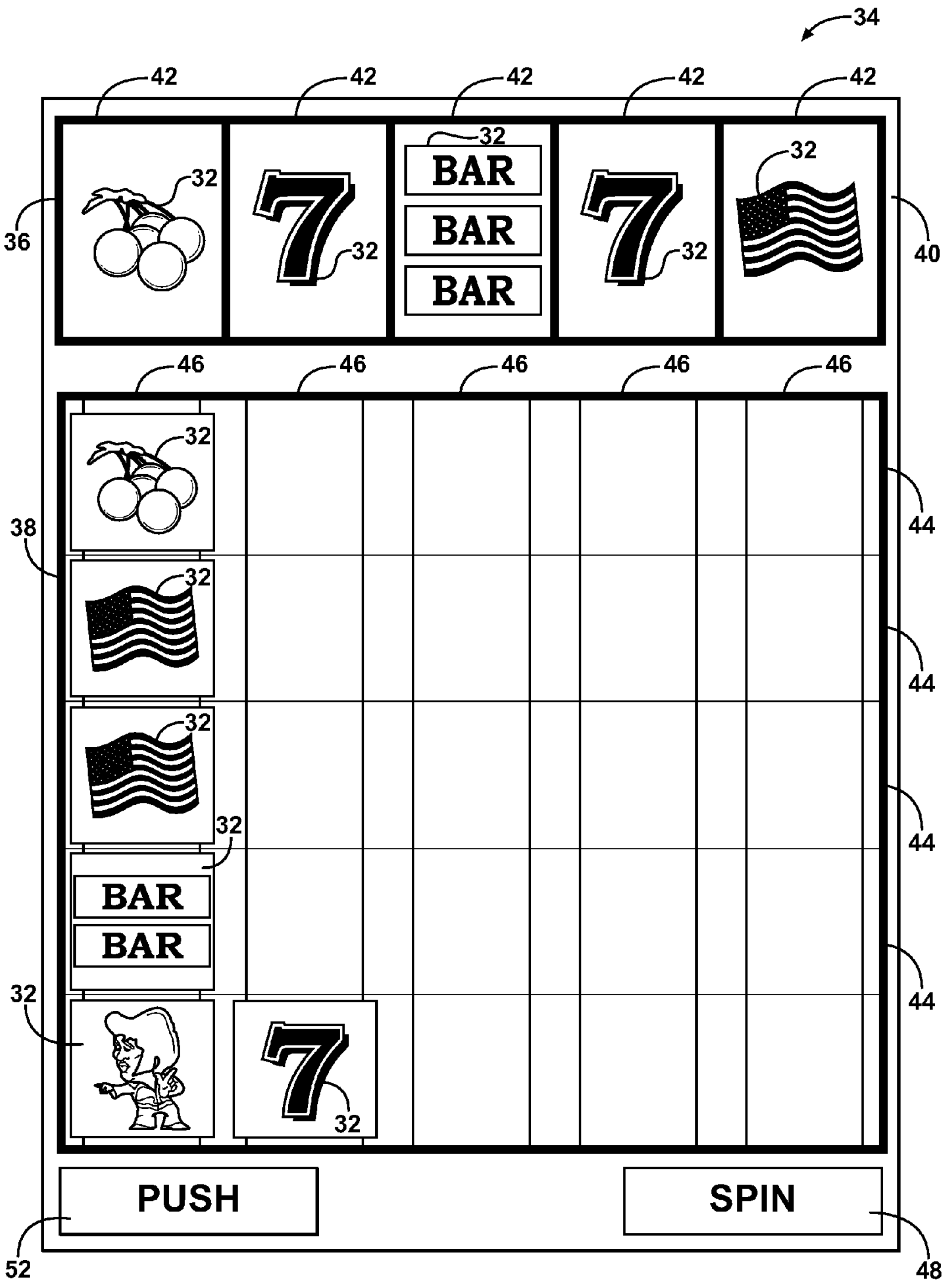
FIG. 6 is a graphical representation of the display the grid section with a 5×5 grid.

The grid section 38 displays 34 a plurality of icons 32 in a plurality of grid rows 44 and a plurality of grid columns 46. Each of the grid columns 46 corresponds to one of the reel columns 42. In one embodiment, the reel section 36 is disposed above the grid section 38 such that each of the reel columns 42 is aligned vertically with the corresponding grid column 46. If the display 34 includes the first display 34 and the second display 34 as described above, then the first display 34 may be disposed above the second display 34 with each of the reel columns 42 being aligned vertically with the corresponding grid column 46. However, it should be appreciated that the reel section 36 and the grid section 38 of the display 34 may be aligned in some other orientation relative to each other, such as in a side by side orientation. As shown in FIGS. 2 through 5, the grid section 38 defines a 3×3 grid, i.e., a grid that holds up to nine icons 32 in three grid columns 46 and three grid rows 44. However, it should be appreciated that the grid section 38 may define different size grids. For example, the grid section 38 may define a 3×5 grid, a 4×4 grid, or a 5×5 grid, or any other sized grid. An embodiment showing a 5×5 grid is shown in FIG. 6.

The gaming machine 20 further comprises a spin device 48 coupled to the controller 26 for signaling the controller 26 to display 34 a random selection of icons 32 in the reel section 36. In one embodiment, the spin device 48 includes a simulated button on the touch screen display 34. Alternatively, the spin device 48 may include a lever or a switch mounted to and supported by the cabinet 22 and coupled to the controller 26. It should be appreciated that the spin device 48 may include some other similar device capable of signaling the controller 26 to display 34 the icons 32 on the reel section 36 of the display 34. Alternatively, the controller 26 may randomly display the icon 32 in the reel section 36 of the display 34, without input from the player, to provide a Class II gaming environment, as defined by the Indian Gaming Regulatory Act.

The gaming machine 20 further comprises a selector device 50 for selecting one of the icons 32 displayed in the reel section 36 of the display 34. In one embodiment, the selecting device includes the touch screen display 34, such that the icon 32 is selected by touching the display 34. However, it should be appreciated that the selector device 50 may include some other device capable of identifying a specific icon 32 and communicating the selected icon 32 to the controller 26.

The gaming machine 20 further comprises a transfer device 52 coupled to the controller 26 for signaling the controller 26 to transfer the selected icon 32 from the reel column 42 in the reel section 36 of the display 34 to the grid column 46 in the grid section 38 of the display 34 corresponding to the reel column 42 in which the icon 32 is displayed. In one embodiment, the transfer device 52 includes a simulated button on the touch screen display 34. Alternatively, the transfer device 52 may include a lever or a switch mounted to and supported by the cabinet 22 and coupled to the controller 26. It should be appreciated that the transfer device 52 may include some other similar device capable of signaling the controller 26 to transfer the icons 32 from the reel column 42 to the grid column 46 corresponding to the reel column 42 in which the icon 32 is displayed.

The subject invention also provides a method of playing a game on the gaming machine 20 described above. The game includes a primary game and a secondary game. In one embodiment, the secondary game is a bonus game for the primary game. In another embodiment, the secondary game is inclusive to, i.e., part of the primary game.

The method comprises the step of storing a plurality of different icons 32 in the memory 30 of the gaming machine 20. As described above, the memory 30 stores a plurality of data files including the information necessary to display 34 each of the plurality of icons 32 on the display 34.

As related to the primary game, the method comprises the steps of defining a winning reel alignment for the primary game, and indicating a win if an alignment of the icons 32 displayed in the reel section 36 of the display 34 is equal to the defined winning reel alignment. The gaming machine 20 may also provide a monetary value payout based on the result of the icons 32 displayed in the reel section 36 of the display 34 after the step of activating the spin device 48 to display 34 the icons 32 in the reel section 36. For example, the gaming machine 20 may provide the payout if the icons 32 resulting from the spin are identical or similar to one another. Accordingly, the primary game described above is similar to a standard video slot machine game.

As related to the secondary game, the method comprises the step of defining a winning grid alignment of icons 32 for the secondary game. The winning grid alignment of icons 32 is a pattern of icons 32 displayed in the grid section 38 of the display 34. One object of the secondary game is to arrange icons 32 in the grid section 38 of the display 34 to equal the winning grid alignment. The step of defining a winning grid alignment may further be defined as defining a plurality of winning grid alignments. Accordingly, a player may have several different winning grid alignments in which the player may attempt to arrange the icons 32 in.

Formation of the winning grid alignment will result in a "win" and in one embodiment, will result in a monetary value payout to the player. However, it should be appreciated that if the gaming machine 20 and the game are used for non-wagering purposes, i.e., amusement purposes, the "win" will not result in a monetary value payout to the player. One suitable pattern is a line of identical or similar icons 32. Similar icons 32 could include, but are not limited to, the same shaped icon 32 but with each icon 32 having a different color. The line may be oriented vertically, horizontally, or diagonally on the grid. The number of icons 32 needed to form the line may vary depending on the size of the grid and other factors. As shown in FIGS. 2 through 5 with a 3×3 grid, three icons 32 are needed to form the line pattern. Of course, other patterns may also be suitable. For example, a "four-corners" pattern, i.e., where each corner of the grid contains an identical or similar icon 32, may be suitable to generate a win for the player.

If the game is being played for wagering, i.e., gambling purposes, the method may further comprise the step of charging a credit for each spin of the reel section 36, i.e., for each activation of the spin device 48. The player may be required to input a pre-determined value into the monetary value input device 24 prior to each spin of the reel section 36, i.e., each activation of the spin device 48, or alternatively may input a deposited amount into the monetary input device and deduct the pre-determined value from the deposited amount in response to each spin of the reel section 36, i.e., each activation of the spin device 48. The gaming machine 20 may also be coupled to a network, permitting the player to access an existing account from which the credit may be charged or deducted in response to each spin of the reel section 36, i.e., each activation of the spin device 48. It should be appreciated that the step of charging a credit for each spin of the reel device may be accomplished in some other similar manner not described herein.

The method further comprises the step of displaying an icon 32 in each cell of the reel section 36 of the display 34. The step of displaying an icon 32 in each cell of the reel section 36 of the display 34 may further be defined as activating the spin device 48 to spin the reel section 36 of the display 34 to randomly generate a new set of icons 32 to display 34 in the cells of the reel section 36. The controller 26 randomly selects the icons 32 to be displayed on the reel section 36 of the display 34 once signaled by the spin device 48 to display 34 the icons 32 on the reel section 36 of the display 34.

After the player has activated the spin device 48 to spin the simulated reels and display 34 a new set of icons 32 in the reel section 36, the player may then select one or more icons 32. In one embodiment, the player is limited by the gaming machine 20 to selecting a single icon 32. However, it should be appreciated that the gaming machine 20 may permit multiple icons 32 to be selected. Accordingly, the method further comprises the step of selecting one of the icons 32 displayed in the reel section 36 of the display 34. If the display 34 includes the touch screen display 34, the step of selecting one of the icons 32 displayed in the reel section 36 of the display 34 may include touching the display 34 to select one of the icons 32 displayed in the reel section 36 of the display 34. The user utilizes the selector device 50 to select the icon 32 in the reel section 36 of the display 34. In one embodiment, the user selects the icon 32 by touching the icon 32 on the touch screen display 34. However, it should be appreciated that the player may select the icon 32 in some other manner. Alternatively, the step of selecting one of the icons 32 displayed on the reel section 36 is may further be defined as randomly selecting one of the icons 32 displayed on the reel section 36 by the controller 26. Accordingly, once the controller 26 displays 34 the icons 32 in the reel section 36 of the display 34, the controller 26 randomly selects one of the icons 32, without input from the player. Accordingly, the player is not allowed to select which icon 32 (s) are transferred from the reel section 36 to the grid section 38. This allows easy implementation of the gaming machine 20 in a Class II gaming environment, as defined by the Indian Gaming Regulatory Act.

Figure 3:
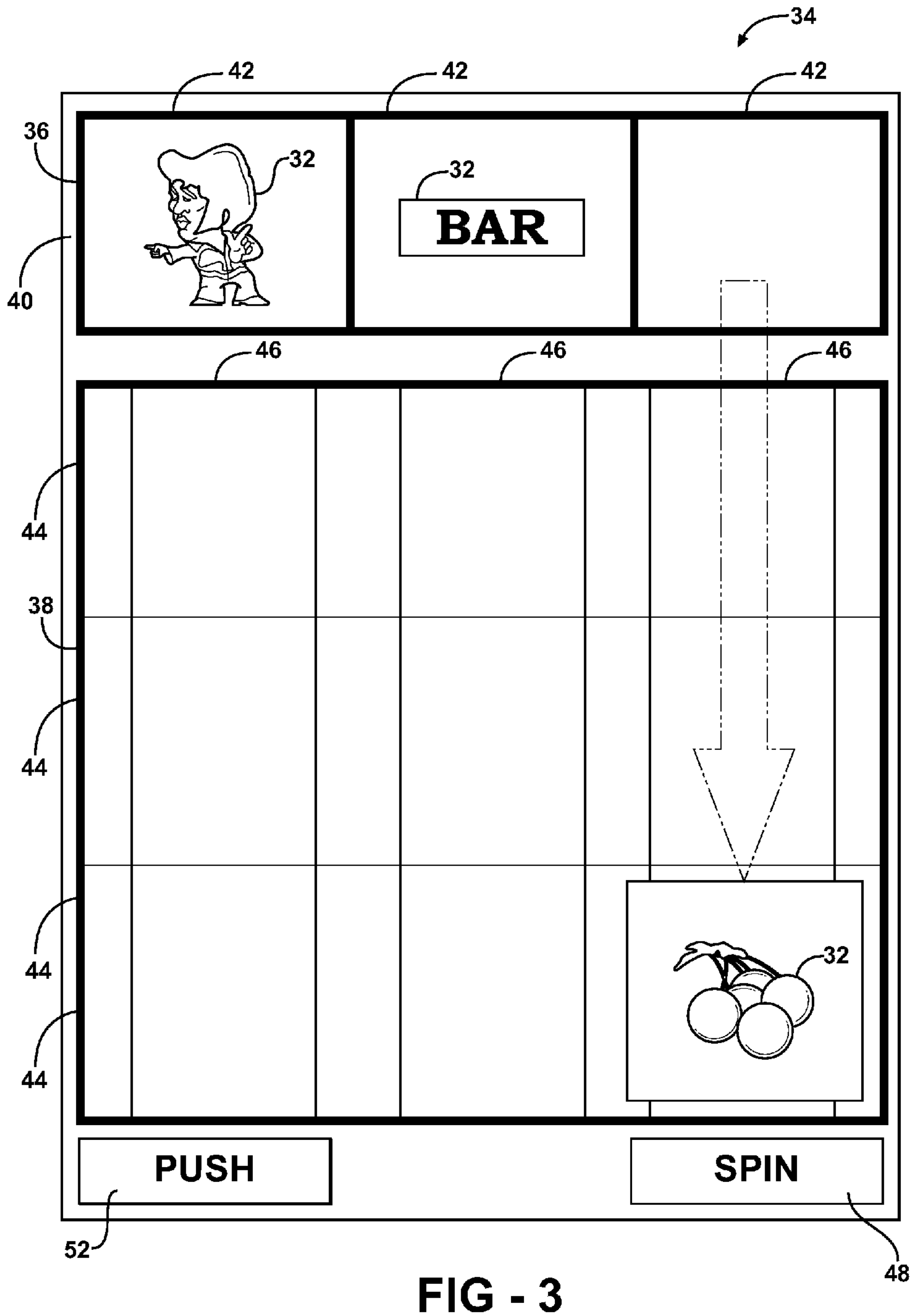
FIG. 3 is a graphical representation of the display showing an icon falling from the reel section to the grid section.

After the player has chosen the icon(s) 32, the player may then select to transfer the selected icon 32 into the grid section 38, i.e., "push" or "drop" the selected icon 32 into the grid section 38. Accordingly, the method comprises the step of transferring the selected icon 32 from the reel section 36 to a lowermost unoccupied cell in the grid column 46 of the grid section 38 corresponding to the specific reel column 42 in which the icon 32 is displayed. The player activates the transfer device 52 to transfer the selected icon 32 from the reel section 36 of the display 34 to the grid section 38 of the display 34. In one embodiment, the player activates the transfer device 52 by touching the simulated button on the touch screen display 34 representing the transfer device 52. However, it should be appreciated that the player may activate the transfer device 52 in some other manner. Once the transfer device 52 is activated, the selected icon 32 "falls" into the corresponding column of the grid section 38 of the display 34. In other words, the selected icon 32 is moved to the lowest unoccupied grid row 44 of the grid column 46 in the grid section 38 corresponding to the position of the icon 32 in the reel column 42 of the reel section 36. For example, referring to FIG. 2, if the player has selected the "cherry" icon 32, then the "cherry" icon 32 falls to the bottom of the grid section 38, as shown in FIG. 3.

Game play continues repetitively in this fashion. After transferring the icon 32 (s) from the reel section 36 to the grid section 38, the player activates the spin device 48 to generate new icons 32 in the reel section 36 for selecting and transferring into the grid section 38. Accordingly, the method further comprises the step of repeating the steps of displaying an icon 32 in each cell of the reel section 36 of the display 34, selecting one of the icons 32 displayed in the reel section 36 of the display 34 and transferring the selected icon 32 from the reel section 36 to the lowermost unoccupied cell in the grid column 46 of the grid section 38 corresponding to the specific reel column 42 in which the icon 32 is displayed to position a plurality of icons 32 in the grid section 38 of the display 34. An example of the grid section 38 after several iterations is shown in FIG. 4.

The method further comprises the step of indicating a win if an alignment of the icons 32 positioned in the grid section 38 of the display 34 is equal to the defined winning grid alignment. The win may be indicated in several manners, such as by displaying a message on the display 34, playing an audio message, flashing one or more lights coupled to the cabinet 22, or in some other similar manner. An example of an alignment of the icons 32 positioned in the grid section 38 equaling a pre-defined winning grid alignment is shown in FIG. 5.

If the game is played for wagering purposes, i.e., gambling purposes, the method further may further comprise the step of dispensing a payout upon an indication of a win. In one embodiment, the payout is in the form of a monetary value payout, and may be dispensed directly to the player through the monetary value input device 24, or may be credited to an account associated with the player. If multiple winning grid alignments are pre-defined, the step of dispensing a payout may further be defined as varying a value of the payout based upon which one of the plurality of winning grid alignments is equaled by the alignment of icons 32 in the grid section 38 of the display 34. The gaming machine 20 may vary the value of the payout based on the icon(s) 32 that makes up the winning grid alignment. For instance, a pattern of "Elvis" icons 32 may result in a higher payout than a pattern of "cherry" icons 32. This varied payout may be altered based on the theme of the gaming machine 20. Also, the gaming machine 20 may vary the value of the payout based on the shape of the pattern of the icons 32. For example, a diagonal pattern of icons 32 may result in a higher payout than a vertical or horizontal pattern of icons 32. It should be appreciated that the value of the payout may be varied in some other manner not described herein.

The method further comprises the step of removing the icons 32 from the grid section 38 of the display 34 that equal the defined winning alignment upon an indication of a win. Accordingly, after a winning grid alignment is generated, the icons 32 that make up the winning grid alignment are removed from the grid section 38.

Should any icons 32 be located above (i.e., in a grid row 44 closer to the top of the grid section 38) the removed icons 32 that made up the winning grid alignment, those icons 32 fall into lower grid rows 44. Accordingly, the method further comprises the step of shifting downward all icons 32 displayed in the grid column 46 above the icons 32 removed from the grid section 38 upon an indication of a win. As a result of shifting downward all icons 32 displayed in the grid column 46 above the icons 32 removed form the grid section 38 upon and indication of a win, a secondary winning grid alignment of icons 32 may be formed. Therefore, the method further comprises the step of indicating a win if an alignment of the icons 32 in the grid section 38 after shifting downward all icons 32 displayed in the grid column 46 above the icons 32 removed from the grid section 38 upon an indication of a win is equal to the defined winning grid alignment. As an incentive, the gaming machine 20 may payout an additional bonus for such secondary winning grid alignments.

The method further comprises the step of removing the lowermost icon 32 in the grid column 46 when the selected icon 32 is transferred into a grid column 46 with all cells occupied. In the event that a grid column 46 of the grid section 38 is filled with icons 32, the gaming machine 20 may permit one or more of the icons 32 of the reel section 36 to be transferred, i.e., "pushed" downward into the corresponding grid column 46 of the grid section 38. This results in a shift of each icon 32 in that grid column 46 downward and the lowermost icon 32 (i.e., the icon 32 in the lowest grid row 44 of that grid column 46) to be removed from the grid section 38. Alternatively, in the event a grid column 46 of the grid section 38 is filled with icons 32, the gaming machine 20 could prevent entry of the icon 32 into the filled grid column 46 and force the player to select a different icon 32 from a different reel column 42 of the reel section 36 to transfer into an unfilled cell of the corresponding grid column 46.

The method may further comprise the step of deleting an icon 32 displayed in the grid section 38 of the display 34. Accordingly, the player may select one or more icons 32 displayed within the grid section 38 of the display 34 to delete. In addition, the step of deleting an icon 32 displayed in the grid section 38 may be further defined as deleting all icons 32 displayed in the grid section 38. Accordingly, the gaming machine 20 may permit deletion, i.e., removal, of all icons 32 from the filled grid column 46 or the entire grid section 38 of the display 34. Additionally, the method may further comprising the step of shifting downward all icons 32 displayed in the grid column 46 above the icon 32 deleted from the grid section 38 upon deletion of one or more icons 32 from the grid section 38.

The method may further comprise the step of defining a situational icon 32. The situational icon(s) 32, i.e., special icon(s) 32 are for performing a pre-determined function of the game. For example, the situational icon 32 may include a "bomb" icon 32 that when transferred to the grid section 38 automatically deletes all icons 32 currently displayed in the grid section 38 of the display 34. As a player is unlikely to select such a situational icon 32, the method may further comprise the step of automatically selecting the situational icon 32 and automatically transferring the situational icon 32 from the reel section 36 to a lowermost unoccupied cell in the grid section 38 corresponding to the specific reel column 42 in which the situational icon 32 is displayed upon the situational icon 32 being displayed in the reel section 36 of the display 34. Such a "bomb" situational icon 32 may be utilized to prevent the player from attempting to wait for the icons 32 having the highest monetary value payout to appear in the reel section 36 of the display 34. It should be appreciated that the situational icon 32 could include some other icon 32 and correspond to some other function, such as an icon 32 representing an automatic win.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of playing a game on a gaming machine including a controller and a display having a reel section defining a plurality of cells disposed in one reel row and a plurality of reel columns and a grid section defining a plurality of cells disposed in a plurality of grid rows and a plurality of grid columns with each of the grid columns corresponding to one specific reel column, said method comprising the steps of:

allowing a player to make a wager;

defining a winning grid alignment of icons;

displaying an icon in each cell of the reel section of the display;

providing an award to the player if the displayed icons display a winning outcome;

allowing a player to select one of the icons displayed in the reel section of the display;

transferring, by the gaming machine, the selected icon from the reel section to a lowermost unoccupied cell in the grid column of the grid section corresponding to the specific reel column in which the selected icon is displayed;

repeating the steps of displaying an icon in each cell of the reel section of the display, selecting one of the icons displayed in the reel section of the display and transferring the selected icon from the reel section to the lowermost unoccupied cell in the grid column of the grid section corresponding to the specific reel column in which the selected icon is displayed to position a plurality of icons in the grid section of the display; and indicating a win if an alignment of the icons positioned in the grid section of the display is equal to the defined winning grid alignment and responsively awarding the player a second award.

2. A method as set forth in claim 1 further comprising the step of removing the icons from the grid section of the display that equal the defined winning alignment upon an indication of a win.

3. A method as set forth in claim 2 further comprising the step of shifting downward all icons displayed in the grid column above the icons removed from the grid section upon an indication of a win.

4. A method as set forth in claim 3 further comprising the step of indicating a win if an alignment of the icons in the grid section after shifting downward all icons displayed in the grid column above the icons removed from the grid section upon an indication of a win is equal to the defined winning grid alignment.

5. A method as set forth in claim 4 further comprising the step of awarding an additional prize.

6. A method as set forth in claim 1 further comprising the step of removing the lowermost icon in the grid column when the selected icon is transferred into a grid column having all cells occupied.

7. A method as set forth in claim 1 further comprising the step of deleting an icon displayed in the grid section of the display.

8. A method as set forth in claim 7 further comprising the step of shifting downward all icons displayed in the grid column above the icon deleted from the grid section.

9. A method as set forth in claim 8 further comprising the step of awarding an additional prize if the icon alignment in the grid section matches one or more defined winning grid alignments.

10. A method as set forth in claim 1 further comprising the step of deleting all icons displayed in the grid section.

11. A method as set forth in claim 1 further comprising the step of defining a situational icon.

12. A method as set forth in claim 11 further comprising the step of automatically selecting the situational icon and automatically transferring the situational icon from the reel section to a lowermost unoccupied cell in the grid section corresponding to the specific reel column in which the situational icon is displayed upon the situational icon being displayed in the reel section of the display.

13. A method as set forth in claim 1 wherein the step of defining a winning grid alignment is further defined as defining a plurality of winning grid alignments.

14. A method as set forth in claim 13 further comprising the step of dispensing a payout upon an indication of a win.

15. A method as set forth in claim 14 wherein the step of dispensing a payout is further defined as varying the payout based upon which one of the plurality of winning grid alignments is equaled by the alignment of icons in the grid section of the display.

16. A method as set forth in claim 1 wherein the gaming machine includes a spin device and said method further comprises the step of activating the spin device to generate a new set of icons to display in the cells of the reel section.

17. A method as set forth in claim 16 further comprising the step of charging a credit for each activation of the spin device.

18. A method as set forth in claim 1 wherein the gaming machine includes a memory and said method further comprises the step of storing a plurality of different icons in the memory.

19. A method as set forth in claim 1 wherein the display includes a touch screen display and said step of selecting one of the icons displayed in the reel section of the display includes touching the display to select one of the icons displayed in the reel section of the display.

20. A method as set forth in claim 1 wherein the gaming machine includes a controller and the step of selecting one of the icons displayed on the reel section is further defined as randomly selecting one of the icons displayed on the reel section by the controller.

21. A method as set forth in claim 1 further including the step of defining a winning reel alignment.

22. A method as set forth in claim 21 further including the step of indicating a win if an alignment of the icons displayed in the reel section of the display is equal to the defined winning reel alignment.

23. A method, as set forth in claim 1, including the step of selecting one of the icons displayed in the grid section of the display, removing the selected one of the icons displayed in the grid section of the display; and shifting downward any icons displayed in the grid column above the removed icon.

24. A method, as set forth in claim 23, wherein the step of selecting one of the icons displayed in the grid section of the display includes the step of allowing the player to choose which icon is selected.

25. A method, as set forth in claim 23, further including the step of awarding the player an additional prize if the icon alignment in the grid section matches one or more defined icon alignments.

26. A gaming machine comprising:

a controller having a processor configured to operate a software program and a memory configured to store data;

a display having a reel section configured to display a plurality of icons in one reel row and a plurality of reel columns and a grid section configured to display a plurality of icons in a plurality of grid rows and a plurality of grid columns with each of said grid columns corresponding to one of said reel columns;

a selector device configured to allow a player to select one of the icons displayed in said reel section of said display; and, a transfer device configured to transfer a selected icon from said reel column in said reel section to said grid column in said grid section corresponding to said reel column in which the icon is displayed, the controller configured to award a first award if the displayed icons in the reel section display a winning outcome and to award a second award if the displayed icons in the grid section display a winning outcome.

27. A gaming machine as set forth in claim 26 further comprising a monetary value input device.

28. A gaming machine as set forth in claim 27 further comprising a spin device configured to display a random selection of icons in said reel section.

29. A gaming machine as set forth in claim 28 wherein said display includes a touch screen display.

30. A gaming machine as set forth in claim 28 wherein said display includes a first display configured to display said reel section and a second display configured to display said grid section.

31. A gaming machine as set forth in claim 30 wherein said first display is disposed above said second display such that each of said reel columns are aligned vertically with said corresponding grid columns.

32. A gaming machine, as set forth in claim 26, the controller configured to select one of the icons displayed in the grid section of the display, to remove the selected one of the icons displayed in the grid section of the display and to shift downward any icons displayed in the grid column above the removed icon.

33. A gaming machine, as set forth in claim 32, the controller awarding the player a third prize if the icon alignment in the grid section matches one or more defined icon alignments.

34. A gaming machine, as set forth in claim 26, wherein the controller in selecting one of the icons displayed in the grid section of the display allows a player to choose which icon is selected.

35. A gaming machine for providing a game to a player, comprising:

a display having a plurality of cells, the cells being displayed in a predetermined arrangement having a first section and a second section, the first section having a predetermined number of columns, each column of the first section being associated with a column in the second section;

a user interface; and, a game controller being coupled to the display and user interface and configured to allow a player to make a wager using the user interface, to randomly display an icon in each cell of the first and second sections of the display, to provide an award to the player if the icons in the first section is a winning outcome and to allow the player to establish one of the cells of the first section using the user interface, the one of the cells of the first section being within one of the columns of the first section, to transfer the icon within the one of the cells of the first section into one of the cells of the associated column in the second section, for to allow the player to select one of the icons displayed in the second section of the display, to remove the selected one of the icons displayed in the second section of the display; and to shift downward any icons displayed in the associated column of the second section above the removed icon, and to provide a second award to the player if the icons in the second section are a winning outcome.

36. A method of playing a game on a gaming machine including a controller and a display having a plurality of cells, the cells being displayed in a predetermined arrangement having a first section and a second section, the first section having a predetermined number of columns, each column of the first section being associated with a column in the second section, the method comprising the steps of:

allowing a player to make a wager;

randomly displaying an icon in each cell of the first and second sections of the display;

providing an award to the player if the icons in the first section is a winning outcome;

allowing the player to establish one of the cells of the first section, the one of the cells of the first section being within one of the columns of the first section;

transferring, by the gaming machine, the icon within the one of the cells of the first section into one of the cells of the associated column in the second section;

allowing the player to select one of the icons displayed in the second section of the display;

removing the selected one of the icons displayed in the second section of the display;

shifting downward any icons displayed in the associated column of the second section above the removed icon; and, providing a second award to the player if the icons in the second section are a winning outcome.

* * * * *

UNITED STATES PATENT AND TRADEMARK OFFICE

CERTIFICATE OF CORRECTION

PATENT NO. : 8,096,871 B2
APPLICATION NO. : 12/024212
DATED : January 17, 2012
INVENTOR(S) : Karl Roelofs It is certified that error appears in the above-identified patent and that said Letters Patent is hereby corrected as shown below:

Claim 35: Column 12, line 6: Please delete the word “for”.

Signed and Sealed this
Sixth Day of March, 2012

David J. Kappos
*Director of the United States Patent and Trademark Office*